United States Patent
Rast, III et al.

(10) Patent No.: US 12,145,338 B2
(45) Date of Patent: Nov. 19, 2024

(54) TUBE/MANDREL ASSEMBLIES

(71) Applicant: Zeus Company Inc., Orangeburg, SC (US)

(72) Inventors: Edward H. Rast, III, Cameron, SC (US); Daniel Green, Orangeburg, SC (US); Dana Barringer, Orangeburg, SC (US); Denise Browne, Orangeburg, SC (US); Patrick Cooper, Orangeburg, SC (US)

(73) Assignee: Zeus Company LLC, Orangeburg, SC (US)

( * ) Notice: Subject to any disclaimer, the term of this patent is extended or adjusted under 35 U.S.C. 154(b) by 0 days.

(21) Appl. No.: 17/690,328

(22) Filed: Mar. 9, 2022

(65) Prior Publication Data

US 2022/0288879 A1 Sep. 15, 2022

Related U.S. Application Data

(60) Provisional application No. 63/160,396, filed on Mar. 12, 2021.

(51) Int. Cl.
*B29D 23/18* (2006.01)
*B29C 53/38* (2006.01)
(Continued)

(52) U.S. Cl.
CPC .............. *B29D 23/18* (2013.01); *B29C 53/38* (2013.01); *B29C 53/58* (2013.01); *B29C 70/207* (2013.01);
(Continued)

(58) Field of Classification Search
CPC ...... B29D 23/18; B29D 23/001; B29D 23/00; B29C 53/38; B29C 53/58; B29C 70/207;
(Continued)

(56) References Cited

U.S. PATENT DOCUMENTS

| 10,744,231 B1 | 8/2020 | Wahab et al. |
| 2003/0028241 A1* | 2/2003 | Stinson ..................... A61F 2/91 |
| | | 623/1.15 |

(Continued)

FOREIGN PATENT DOCUMENTS

| WO | WO 2019/094443 A1 | 5/2019 |
| WO | WO 2020/067582 A1 | 4/2020 |

OTHER PUBLICATIONS

PCT Search Report & Written Opinion dated Jul. 8, 2022 which issued in corresponding PCT Application No. PCT/US2022/019474.

(Continued)

*Primary Examiner* — James C Yager
(74) *Attorney, Agent, or Firm* — Jessica L. Gorczynski; Womble Bond Dickinson (US) LLP

(57) ABSTRACT

The disclosure relates to assemblies of thin-walled tubes and mandrels for use in thin wall catheter liners. For example, an assembly is provided that includes a thin-walled PTFE tube comprising walls with a thickness of less than 0.004 inches, positioned over a filled mandrel comprising PTFE with one or more fillers incorporated therein. The disclosure further provides, independently, thin-walled tubes and filled mandrels, as well as methods of making and using such components.

13 Claims, 1 Drawing Sheet

(51) Int. Cl.
  *B29C 53/58*  (2006.01)
  *B29C 70/20*  (2006.01)
  *B29C 70/30*  (2006.01)
  *B29D 23/00*  (2006.01)
  *B29C 63/10*  (2006.01)

(52) U.S. Cl.
  CPC .......... *B29C 70/302* (2021.05); *B29D 23/001* (2013.01); *B29C 63/10* (2013.01)

(58) Field of Classification Search
  CPC ....... B29C 70/302; B29C 63/10; B29C 70/58; B29C 48/0018; B29C 48/09; B29C 48/32; B29C 55/22; B29C 63/18; B29C 63/22; B29L 2023/001; B29L 2031/7542; B29B 11/10; B29K 2027/18; B29K 2105/06
  See application file for complete search history.

(56) References Cited

U.S. PATENT DOCUMENTS

| | | |
|---|---|---|
| 2006/0154010 A1 | 7/2006 | Oyama |
| 2007/0225443 A1 | 9/2007 | Skelskey et al. |
| 2012/0013061 A1 | 1/2012 | Atladottir et al. |
| 2014/0294727 A1 | 10/2014 | Narasimhaswamy et al. |
| 2015/0025562 A1 | 1/2015 | Dinh et al. |
| 2019/0314604 A1 | 10/2019 | Jackson et al. |
| 2022/0265897 A1* | 8/2022 | Davison ................. A61L 27/34 |

OTHER PUBLICATIONS

The Influence of the Contact Surface Roughness on the Static Friction Coefficient*—B. Ivkovic, M. Djurdjanovic, D. Stamenkovic—Tribology in industry, vol. 22, No. 3&4, 2000—pp. 41-44.

Grit Blasting—an overview—SchienceDirect Topics—Material Surface Preparation Techniques—Nanotechnology-Enhanced Orthopedic Materials, 2015—9 pages.

Radiopaque—Polymer Composites for Dental Fillings—Radiopaque—an overview—SchienceDirect Topics—Applications of Nanocomposite Materials in Dentistry, 2019—10 Pages.

Surface Roughness Explained—Ra Roughness Chart—team@get-it-made.co.uk—Written by Luke Smoothy—Feb. 22, 2024—pp. 1-22.

Radiopaque nano and polymeric materials for atherosclerosis imaging, embolization and other catheterization procedures; Li Tian, Linfeng Lu, James Feng, Marites P. Melancon—Chinese Pharmaceutical Association Institute of Materia Medica, Chinese Academy of Medical Sciences—Acta Pharmaceutica Sinica B—pp. 360-370—Received Nov. 3, 2027; Received in Revised form Jan. 18, 2018; accepted Feb. 8, 2018.

ProPlate—How does the surface roughness of metallic catheter-based components affect the adherence of radiopaque marker coatings? https://www.proplate.com/how-does-the-surface-roughness-of-metallic-catheter-based-components-affect-the-adherence-of-radiopaque-market-coatings/#:~test=The%20surface%20roughness%20of%20metallic%20catheter%20based%20components%20can%20directly,the%20coating%20to%20the%20substrate.

* cited by examiner

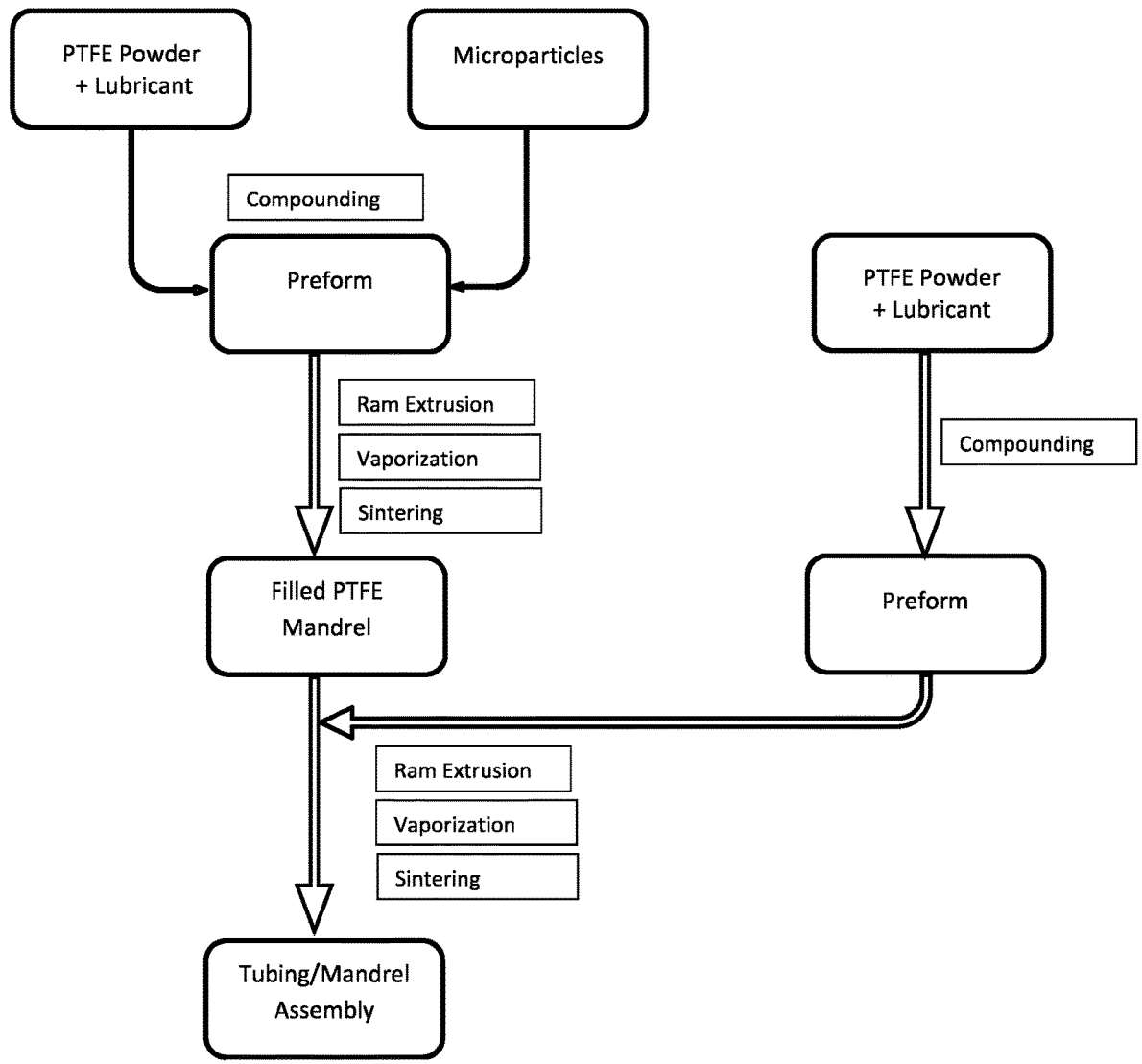

TUBE/MANDREL ASSEMBLIES

CROSS-REFERENCE TO RELATED APPLICATION

The present application claims priority to and the benefit of U.S. Provisional Patent Application No. 63/160,396, filed Mar. 12, 2021, the disclosure of which is incorporated herein by reference in its entirety.

FIELD OF THE INVENTION

The present application is directed to polymeric tubes, mandrels, and assemblies comprising such components, which find application in a variety of fields.

BACKGROUND OF THE INVENTION

Various thin-walled polymeric tubes and devices comprising such tubes (e.g., poly(tetrafluoroethylene) ("PTFE")-containing tubes and devices), as well as methods of producing such thin-walled tubes and devices are known. Traditional methods for preparing thin-walled PTFE tubes use stainless steel or silver-plated copper wire or mandrels to draw down a PTFE preform, providing a thin-walled PTFE tube thereon. However, such methods may suffer from difficulties removing the thin-walled PTFE tubes from the mandrels.

One method for producing patterned plastic tubes involves extruding a tube over a textured tapered pin to transfer the surface texture of the pin to the inside diameter of the tube. Another method provides for the use of a mold with a patterned microstructured surface to impart non-random microstructures on the molded part. In methods involving molds, a debonding agent is commonly employed to help in the demolding process, which may introduce one or more contaminants to the molded surface. Polymer-based tubes can also be prepared, e.g., via extrusion of a polymeric (e.g., PTFE) liner over a metallic core or by stretching a PTFE liner over a wire mandrel to improve modulus and tensile strength during catheter construction. It would be beneficial to provide further methods for the production of polymer-containing tubes and devices (e.g., patterned polymer-containing tubes) exhibiting desirable physical properties (e.g., strength and flexibility).

SUMMARY OF THE INVENTION

The present invention relates generally to methods for the production of polymeric tubes and to polymeric tubes produced by such methods.

In one aspect is provided an assembly comprising: a thin-walled PTFE tube comprising walls with a thickness of less than 0.004 inches, positioned over a filled mandrel comprising PTFE with one or more fillers incorporated therein.

In another aspect of the disclosure is provided a filled mandrel comprising PTFE with one or more fillers incorporated therein, wherein the one or more fillers comprise microparticles.

With respect to the above-referenced aspects, the one or more fillers can, in some embodiments, comprise microparticles. The types of microparticles can vary; for example, they may be selected from the group consisting of glass beads, glass bubbles, clay, silica, silicates, metal oxides, metal hydroxides, and combinations thereof. The concentration of the microparticles can also vary; for example, the microparticles can be at a concentration of less than 10% by weight of the filled mandrel or at a concentration of less than 5% by weight in the filled mandrel.

In some embodiments, a filled mandrel is provided as referenced herein above, wherein the filled mandrel has a surface roughness that is characterized by: a minimum average surface roughness, Ra, of 20 µ-inch; and/or a minimum LMS surface roughness, Rm, of 30µ-inch (including, e.g., embodiments wherein the surface roughness is characterized by both a minimum average surface roughness, Ra, of 20 µ-inch; and a minimum LMS surface roughness, Rm, of 30 µ-inch).

In a further aspect is provided a tube having an inner surface, an outer surface, and an inner lumen, the tube comprising PTFE with a wall thickness less than 0.0040 inches, wherein the tube has a stress at break above 10,000 psi; and wherein the inner surface has a minimum COF below 0.07.

In a still further aspect is provided a tube having an inner surface, an outer surface, and an inner lumen, the tube comprising PTFE with a wall thickness less than 0.0040 inches, wherein the tube has a stress at break above 10,000 psi; and wherein the inner surface has a minimum average surface roughness, Ra, of 8 µ-inch and/or a minimum LMS surface roughness, Rm, of 25 µ-inch (including, e.g., embodiments wherein the inner surface has both a minimum average surface roughness, Ra, of 8 µ-inch and a minimum LMS surface roughness, Rm, of 25 µ-inch).

With respect to the tubes referenced herein above, in some embodiments, the tube consists essentially of PTFE.

The disclosure further provides a medical device comprising an assembly, a filled mandrel, or a tube as described herein. For example, it may provide a catheter.

In addition, the disclosure provides methods of making and using the disclosed assemblies, filled mandrels, and tubes disclosed herein.

The disclosure includes, without limitations, the following embodiments.

Embodiment 1: An assembly comprising: a thin-walled PTFE tube comprising walls with a thickness of less than 0.004 inches, positioned over a filled mandrel comprising PTFE with one or more fillers incorporated therein.

Embodiment 2: The assembly of Embodiment 1, wherein the filler comprises microparticles.

Embodiment 3: The assembly of any of Embodiments 1-2, wherein the microparticles are selected from the group consisting of glass beads, glass bubbles, clay, silica, silicates, metal oxides, metal hydroxides, and combinations thereof.

Embodiment 4: The assembly of any of Embodiments 1-3, wherein the microparticles are glass beads.

Embodiment 5: The assembly of any of Embodiments 1-4, wherein the microparticles are at a concentration of less than 10% by weight of the filled mandrel.

Embodiment 6: The assembly of any of Embodiments 1-5, wherein the microparticles are at a concentration of less than 5% by weight in the filled mandrel.

Embodiment 7: A filled mandrel comprising PTFE with one or more fillers incorporated therein, wherein the one or more fillers comprise microparticles.

Embodiment 8: The filled mandrel of Embodiment 7, wherein the microparticles are selected from the group consisting of glass beads, glass bubbles, clay, silica, silicates, metal oxides, metal hydroxides, and combinations thereof.

Embodiment 9: The filled mandrel of any of Embodiments 7-8, wherein the microparticles are glass beads.

Embodiment 10: The filled mandrel of any of Embodiments 7-9, wherein the microparticles are at a concentration of less than 10% by weight of the filled mandrel.

Embodiment 11: The filled mandrel of any of Embodiments 7-10, wherein the microparticles are at a concentration of less than 5% by weight in the filled mandrel.

Embodiment 12: The filled mandrel of any of Embodiments 7-11, wherein the filled mandrel has a surface roughness that is characterized by: a minimum average surface roughness, Ra, of 20 µ-inch; and/or a minimum LMS surface roughness, Rm, of 30 µ-inch.

Embodiment 13: The filled mandrel of Embodiment 12, wherein the surface roughness is characterized by both a minimum average surface roughness, Ra, of 20 µ-inch; and a minimum LMS surface roughness, Rm, of 30 µ-inch.

Embodiment 14: A tube having an inner surface, an outer surface, and an inner lumen, the tube comprising PTFE with a wall thickness less than 0.0040 inches, wherein the tube has a stress at break above 10,000 psi; and wherein: the inner surface has a minimum COF below 0.07; and/or the inner surface has a minimum average surface roughness, Ra, of 8 µ-inch and/or a minimum LMS surface roughness, Rm, of 25 µ-inch.

Embodiment 15: A tube having an inner surface, an outer surface, and an inner lumen, the tube comprising PTFE with a wall thickness less than 0.0040 inches, wherein the tube has a stress at break above 10,000 psi and the inner surface has a minimum COF below 0.07.

Embodiment 16: A tube having an inner surface, an outer surface, and an inner lumen, the tube comprising PTFE with a wall thickness less than 0.0040 inches, wherein the inner surface has a minimum average surface roughness, Ra, of 8 µ-inch and/or a minimum LMS surface roughness, Rm, of 25 µ-inch.

Embodiment 17: The tube of any of Embodiments 14-16, wherein the inner surface has both a minimum average surface roughness, Ra, of 8 µ-inch and a minimum LMS surface roughness, Rm, of 25 µ-inch.

Embodiment 18: The tube of any of Embodiments 14-17, consisting essentially of PTFE.

Embodiment 19: A medical device comprising the assembly of any of Embodiments 1-6.

Embodiment 20: A medical device comprising the filled mandrel of any of Embodiments 7-13.

Embodiment 21: A medical device comprising the tube of any of Embodiments 14-18.

Embodiment 22: The medical device of any of Embodiments 18-20, wherein the medical device is a catheter.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 1 is a schematic representation of a method disclosed herein for the production of polymeric tubes.

DETAILED DESCRIPTION OF THE INVENTION

The present invention will now be described more fully hereinafter with reference to the accompanying figures, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The disclosure relates to polymeric tubes, filled mandrels, assemblies comprising such tubes and filled mandrels, and methods of making and using such tubes, filled mandrels, and assemblies.

Assemblies

An assembly as provided herein generally comprises a filled PTFE mandrel and a thin-walled tube positioned over/around the filled PTFE mandrel. The composition and method of producing such assemblies leads to unique and unexpected properties. For example, the thin-walled tube may be endowed with unexpected physical properties as a result of its association with the filled mandrel during production of such assemblies. In certain embodiments, the thin-walled tube is positioned so as to be in close physical contact with the filled mandrel (such that little to no air gap is present there between).

The thin-walled tube generally comprises poly(tetrafluoroethylene) (PTFE) (and will be described as such in the present application, i.e., as a "thin-walled PTFE tube") and in some embodiments, the thin-walled tube consists essentially of PTFE. The disclosure focuses on thin-walled PTFE tubes; it is to be noted, however, that PTFE is used herein in an exemplary manner only; the disclosure is not limited thereto. The principles described herein (and associated methods/products) may be more broadly applicable to all polymers capable of being formed by a paste extrusion process. One non-limiting example of such a polymer suitable as the thin-walled tube is ultra-high-molecular-weight polyethylene ("UHMWPE").

The walls of the thin-walled PTFE tube can vary in thickness but, in certain embodiments, they are less than about 0.004" (~0.1 mm) in thickness or less than about 0.002" (~0.05 mm) in thickness. As such, "thin-walled PTFE tube" (or "thin-walled tube") as used herein generally means a tube with such wall thicknesses. The diameter of the thin-walled PTFE tubes can vary and is not particularly limited.

Advantageously, by virtue of its contact with the filled PTFE mandrel during production (as outlined below), the inner diameter (OD) of the thin-walled PTFE tube can be patterned (e.g., with indentations), the indentations arising from microparticles at or near the surface of the filled mandrel over/around which the thin-walled PTFE tube is positioned in the disclosed assemblies.

The filled PTFE mandrel of the disclosed assemblies is typically substantially cylindrical in shape, i.e., not tapered to any significant extent (e.g., in cylindrical form). The mandrel is generally "filled," i.e., it comprises a base material comprising PTFE with one or more fillers dispersed therein. In some such embodiments, the filler comprises a plurality of microparticles. Examples of microparticles that can be used in the mandrels include glass beads, glass bubbles, clay, silica, silicates, metal oxides, e.g., titanium dioxide, calcium carbonate, metal hydroxides, e.g., magnesium hydroxide, as well as combinations thereof. In some embodiments, one type of microparticles is incorporated within the filled mandrel; in other embodiments, two or more different types of microparticles are incorporated within the mandrel. The microparticles are generally substantially spherical in shape; however, the disclosure is not limited thereto and microparticles can be, e.g., irregular in shape in some embodiments. The microparticles are typically incorporated substantially homogeneously throughout the filled mandrel; however, the disclosure is not limited thereto.

Advantageously, the microparticles may be incorporated in sufficient quantity to help impart stiffness to the filled PTFE mandrel and/or a roughening of the filled PTFE mandrel surface (i.e., giving a "textured" mandrel surface) without sacrificing too much flexibility and toughness. The surface roughness/texture may be created by the presence of randomly-dispersed microparticles at or near the surface of the filled PTFE mandrel (i.e., a random microstructure on the surface of the filled PTFE mandrel). The quantity of microparticles required to achieve the desired stiffness and/or roughening of the surface may depend on the type and size of filler used. In some embodiments, the quantity of filler, e.g., microparticles within the filled PTFE mandrel is selected based at least in part on the desired properties for one or more of surface roughness, stiffness, flexibility, toughness, etc. associated with the filled PTFE mandrel. In particular embodiments, the microparticles are included in an amount of less than 10% by weight of the filled mandrel or less than 5% by weight of the filled mandrel (e.g., 0.1% to 10% by weight, 0.1% to 5% by weight, 1% to 10% by weight, 1% to 10% by weight, or 2% to 10% by weight).

Methods of Preparing Assemblies

The thin-walled PTFE tube and the filled PTFE mandrel of the disclosed assembly can be produced in various ways. They are typically both formed via extrusion (e.g., using a ram paste extrusion method), as described herein below. In some embodiments, both the filled PTFE mandrel and the thin-walled PTFE tube can be prepared via generally comparable methods, e.g., by compounding or preparing a PTFE resin and a volatile liquid lubricant and mixing the components together to form a paste. The relative amounts of PTFE resin and lubricant can be selected based, e.g., on processing parameters and suitability of the resulting paste for extrusion. The compounded resin mixtures (which are described further below) can be prepressed into preforms or cylinders with or without a hollow core for ease of loading into extruders. The preforms or cylinders are then loaded into an extrusion cylinder/barrel of a paste extruder/ram extruder, which may be in either a horizontal or vertical configuration. Extrusion generally requires the presence of a mandrel (e.g., steel mandrel) in the barrel, which is attached to the back part of the extruder. According to various embodiments, a mandrel can be considered a solid rod or thick-walled tube with sufficient stiffness to resist the pressure encountered during extrusion.

The filled PTFE mandrel component is generally prepared via the PTFE resin/volatile liquid lubricant paste, which further comprises a plurality of microparticles, and this microparticle-containing paste is formed into a preform or cylinder. Compounding the paste with microparticles, in some embodiments, provides the filled PTFE mandrel of the assembly with sufficient hardness and texture to withstand subsequent processing steps in producing the assembly. The filled PTFE mandrel may be manufactured using a ram extruder to mechanically force the preform or cylinder through a die (e.g., a conical die) with a steel mandrel in the center of the die, to form a hollow filled PTFE mandrel. The extruder may also be configured without the steel mandrel to form a solid filled PTFE mandrel, the general structure of which is commonly referred to as a bead or rod. The product coming out of the extruder has the final form and is referred to in general as the "extrudate." The extrudate generally still has the volatile liquid lubricant that is removed through careful heating, e.g., by passing the extrudate through a drying oven called a vaporizer. The dried extrudate is then sintered. Sintering is the process of heating the extrudate to a sufficiently high temperature to consolidate the PTFE resin particles and eliminate voids between the particles to form a solid component. Sintering is typically carried out in an additional oven located after the vaporizer. It can also be attached to the vaporizer or operated separately from the vaporizer. The filled PTFE mandrel component is then collected for use in manufacturing the thin-walled PTFE tube/filled mandrel assembly.

According to various embodiments, the thin-walled PTFE tube is also prepared via extrusion of a PTFE/lubricant preform as described above (without microparticles). Typically, the PTFE/lubricant preform is extruded into a tube and drawn down from the die to coat the filled mandrel (as described in further detail herein below), so as to form the full assembly (comprising the thin-walled PTFE tube over the filled PTFE mandrel). For example, the assembly may be formed utilizing the ram extruder in the following manner.

The filled PTFE mandrel may be fed into the ram extruder from the back into a hollow steel mandrel. The speed at which the filled PTFE mandrel is fed may be controlled through a payoff system prior to entering the ram extruder. The ram extruder then mechanically forces a preform comprising PTFE resin and lubricant through a die (e.g., a conical die) with the steel mandrel in the center (giving a PTFE/lubricant extrudate). The filled PTFE mandrel exits the steel mandrel to fill the inside diameter of the PTFE/lubricant extrudate. The process speeds are controlled such that, in some embodiments, the PTFE/lubricant extrudate is drawn down on top of the filled PTFE mandrel to give a snug fit between these two components (leaving indentations from the microparticles on or near the surface of the filled PTFE mandrel on the inner diameter of the thin-walled PTFE tube). In preferred embodiments, as the extrusion pressure changes during processing, the machine design ensures that ram speed (and therefore extrusion speed) are kept at a constant level.

The PTFE/lubricant extrudate still has the volatile liquid lubricant that must be removed prior to sintering the PTFE. These steps are performed, for example, by first passing the product through (or placing the product within) a vaporization oven. After the devolatilization of the lubricant is effectively completed, the product may be heated in a sintering oven to sinter the extrudate (as referenced above with respect to the extrudate processed to form the filled PTFE mandrel). The sintering oven is usually set at a temperature equal to or higher than the melting point of PTFE (for example, approximately 345° C.). Depending on the line speed and thickness of the PTFE layer, the oven is generally set at well above this temperature. In some embodiments, the lubricant is completely removed from the product before sintering the product in the sintering oven. In the sintering oven, the PTFE particles melt and adhere to each other. As the product is cooled (e.g., upon exiting/being removed from the sintering oven), the PTFE layer goes from a molten coating to a solid tube. The vaporizer and sintering oven advantageously have little effect on the previously sintered filled PTFE mandrel.

This general process for providing assemblies comprising a thin-walled PTFE tube and a filled PTFE mandrel is depicted schematically in FIG. 1. As such, various embodiments include the use of microparticle-filled PTFE mandrel in connection with processing/manufacturing PTFE tubes (e.g., thin-walled PTFE tubes). This process generally allows for the extruded PTFE to be drawn and freely stretched down over the filled PTFE mandrel, thereby increasing the strength of the resultant thin-walled PTFE tube (e.g., in contrast to traditional processes using stainless steel or silver-plated copper wire or mandrels, in which sufficient drawdown was not observed without the extrudate sticking to the underlying metal material). Insufficient drawdown/insufficient stretching is disadvantageous as it is deleterious to physical properties of a thin-walled PTFE tube when the tube is removed from the mandrel or wire/thin-walled tube assembly.

The present disclosure thus provides assemblies comprising a thin-walled PTFE tube and a filled PTFE mandrel which are largely in as-produced form (which, in some embodiments, constitute the final product). In other embodiments, the assembly is further modified in some manner. For example, the assembly can have additional surface modifications such as chemical etching (e.g., to improve bonding with other compounds such as nylons, PEBA, polyimide, and other polymers). The assembly can, in further embodiments, be coated with a layer of material designed to improve the bonding of the thin-walled PTFE tube or designed to otherwise modify the surface characteristics of the tube. According to various embodiments, the assembly may advantageously be used as an intermediate product in the construction of medical devices (e.g., catheters) where overall process ergonomics and efficiency would be improved. In one embodiment, the thin-walled PTFE tube/filled PTFE mandrel assembly can be braided with a reinforcing fiber or wire and then encapsulated with a jacketing material such as PEBA or nylon to form a catheter over the filled PTFE mandrel.

The disclosure provides not only a thin-walled tube/filled mandrel assembly, but further provides these components (i.e., a thin-walled tube (e.g., thin-walled PTFE tube) and a filled mandrel (e.g., a filled PTFE mandrel) individually, such that one or both of the tube and the filled mandrel can be employed independently.

Thin-Walled PTFE Tubes

For example, the thin-walled PTFE tube of the disclosed assembly may be easily removed from the filled PTFE mandrel by, for example, sliding the tube off of the filled PTFE mandrel. The filled PTFE mandrel can be stretched as described below to facilitate the removal of the tube if necessary. Advantageously, in preferred embodiments, no debonding agent is required for removal (thus avoiding introduction of contaminants to the surface of the thin-walled PTFE tube during removal). The thin-walled PTFE tube can then be used independently. The thin-walled PTFE tube exhibits unique physical characteristics imparted by its production method (e.g., patterning/indentations on the inner diameter resulting from close contact with the filled mandrel during production of the assembly). Advantageously, the snug fit of the drawn-down tube over the rough surface of the filled PTFE mandrel during production of the assemblies as provided above leaves such indentations on the inner diameter, which are maintained after removal of the thin-walled PTFE tube from the filled PTFE mandrel. This effect of the filled PTFE mandrel on the thin-walled PTFE tube provides a surface roughness associated with the inner diameter of the thin-walled PTFE tube. For example, in certain non-limiting embodiments, the inner surface has a minimum average surface roughness (Ra) of 8 µ-inch, 10 µ-inch, or 20 µ-inch, and/or a minimum LMS surface roughness, Rm, of 25 µ-inch or 30 µ-inch (e.g., as determined by a profilometer). The indentations act to reduce the coefficient of friction (COF) of the inner diameter of the thin-walled PTFE tube. The COF of the inner diameter or the minimum COF of the inner diameter can, in some embodiments, be below 0.07. The low coefficient of friction in the inner diameter is considerably lower than values reported for thin-walled PTFE tubes made by free extrusion or stretched over smooth mandrels such as traditional wire cores (e.g., reported as being between 0.07 and 0.25; see U.S. Patent Application Publication No. 2015/0025562 to Dinh et al., which is incorporated herein by reference). In some embodiments, the thin-walled PTFE tube can have low wall thicknesses (e.g., less than about 0.004" (~0.1 mm) in thickness or less than about 0.002" (~0.05 mm) in thickness), while exhibiting good strength and flexibility features (e.g., rendering them suitable for use in certain medical device applications, e.g., as the inner liner of a catheter). Further, the referenced low COF is beneficial, e.g., to reducing the force required to deliver a therapy (or other medical devices, etc.) through the lumen of a liner.

According to various embodiments, by extruding a PTFE/lubricant preform through a conical die and drawing the extrudate down to contact a filled PTFE mandrel snugly; sintering the resulting assembly; cooling the assembly to room temperature; and stretching the filled PTFE mandrel to remove the thin-walled PTFE tube therefrom, tubes exhibiting particularly beneficial combinations of properties (as outlined herein) may be readily obtained. For example, the thin-walled PTFE tubes provided herein can exhibit physical properties such as tensile strength, elongation, and modulus which are maintained or improved relative to extrusions over a core comprising a metal wire or mandrel. In one embodiment, the tube has a stress at break above 10,000 psi.

Filled PTFE Mandrel

The filled PTFE mandrel may be provided independently via removal of the thin-walled PTFE tube as described above and/or can be removed by stretching the filled PTFE mandrel (e.g., using an Instron tensile machine). The degree of stretching targeted during this step is usually, for example, at least about 50%, with a maximum stretching percentage of 500% (or until just before the filled PTFE mandrel breaks or the outer diameter of the mandrel reduces down enough to break the bond between the thin-walled PTFE tube and the filled PTFE mandrel). After the filled PTFE mandrel is stretched sufficiently, the thin-walled PTFE tube or the catheter now comprising the thin-walled PTFE tube as an inner liner can be easily removed from the filled PTFE mandrel.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

EXAMPLES

Aspects of the present invention are more fully illustrated by the following examples, which are set forth to illustrate certain aspects of the disclosed methods, materials, and products, and are not to be construed as limiting thereof.

Example 1

Glass beads varying in diameter between 0.0010 and 0.0018 inches were mixed with 6C PTFE resin and lubricant to make a preform. The preform was extruded to form a mandrel with a final loading of 4% glass beads in PTFE after devolatilization of the lubricant and sintering using the method described above. The mandrel had an OD of 0.0660 inches and an ID of 0.0240 inches after sintering. The surface had the characteristics listed in Table 1.

The filled PTFE mandrel was used to manufacture an assembly using F201 PTFE resin to form the coating. After devolatilization of the lubricant and sintering, the filled PTFE mandrel was stretched in the manner described previously and the PTFE coating was removed as a tube for testing.

An Instron 5965 dual column mechanical tester running Bluehill 3 v3.73.4823 operating software was used to determine the tensile properties of the thin-walled PTFE tube. The test was performed at a rate of 2 in/min using a 1 kN (224.8 lbf) load cell attached to pneumatic grips with smooth face inserts set to a 2-inch gage length. At least 5 specimens were tested of each loading, and the average result is reported in Table 1.

A TA instruments Q800 DMA with the film tension fixture was used to determine the thermo-mechanical properties of the thin-walled PTFE tubes. The main property of interest was storage modulus (E'). A temperature scan was performed from −100° C. to 300° C. with an isothermal hold for five minutes at −100° C. The sample was heated at a constant rate of 3° C./min while being displaced at a constant amplitude of 15 μm with a fixed frequency tensile oscillation of 1 Hz. An additional temperature scan was performed from −20° C. to 100° C. at 3° C./min while being displaced at a constant amplitude of 0.00059 inches with a fixed frequency tensile oscillation of 1 Hz. The resulting DMA data was imported into TA instruments TRIOS software v. 4.3 and the averages of the storage modulus, E', are listed in Table 1.

Burst pressure was measured in the following manner using three replicates 14 inches in length cut from each tube. The ID of the cut length was used as a hypo tube and sealed with a die to assemble the test fixture. Pressure was increased slowly at a rate of 3-5 psi per second until rupture. The maximum values observed during the pressure ramp were recorded.

A TA instruments Discovery Hybrid Rheometer (DHR-3) rheometer with the tribo-rheometer accessory was used to determine the tribological properties of the thin-walled PTFE tubes. The main property of interest during this test was the coefficient of friction (COF). The samples were prepared by attaching three tubing sections of 0.2 inches× 0.65 inches each to the three teeth of the half-ring for use with a Ring-on-Plate tribo-rheometry fixture. The ring with mounted samples was then attached to the ring-on-plate upper-geometry holder and lowered to have the samples contact a mirror-finish stainless steel plate at the specified axial force. A tribological test was performed at room temperature (23° C.) from sliding speeds of 0.030 inches/s to 0.30 inches/s under an axial load of 0.225 lbf. An additional tribological test was performed at 40° C. with a 5-minute dwell time at temperature from sliding speeds of 0.030 inches/s to 0.30 inches/s under an axial load of 0.225 lbf. Minimum COF over the stated range in sliding speed was calculated by the TA instruments TRIOS software v4.3. At least 3 samples were tested for each loading and temperature.

The surface roughness parameters of the outer surface of the mandrel and the inner surface of the tube were determined using a Mitutoyo Surftest SV-400 Profilometer with λc=0.03 in.

The physical properties measured for the tube of Example 1 are summarized in Table 2 below.

Example 2

Glass beads varying in diameter between 0.0010 and 0.0018 inches were mixed into a preform with 6C PTFE resin and lubricant and extruded to form a mandrel with a final loading of 5% glass beads in PTFE after sintering using the method described in Comparative Example 1. The mandrel had an OD of 0.0900 inches and an ID of 0.0320 inches after sintering. The surface had the characteristics listed in Table 1.

The filled PTFE mandrel was used to manufacture the assembly of the invention using F201 PTFE resin to form the coating. After sintering, the filled PTFE mandrel was stretched in the manner described previously and the PTFE coating was removed as a tube for testing.

The physical properties measured for the tube of Example 2 are summarized in Table 2 below.

Comparative Example 1

PTFE 6C resin was used to manufacture the mandrel without any microparticles. After extrusion and sintering, the mandrel OD was 0.0715" with a 0.020" thick wall.

F201 PTFE resin was subsequently run with the unfilled mandrel using the same processing set-up and conditions as Example 1. During extrusion of the tube/mandrel assembly, it was noted that the overall OD would decrease periodically. The cause was found to be dimensional instability of the unfilled PTFE mandrel as its temperature increased passing through the metal extruder mandrel. A similar decrease in OD was noted as the assembly exited the sintering oven due to stretching of the unfilled PTFE mandrel. It was concluded that microparticles are required to maintain the dimensional stability of the filled PTFE mandrel going through the extruder and through the sintering oven.

With the unfilled PTFE mandrel, it was not possible to obtain a thin-walled PTFE tube that had sufficient dimensional uniformity for testing.

Comparative Example 2

This tube is as provided in Example 2 of U.S. Pat. No. 10,744,231 to Wahab et al., which is incorporated by reference herein in its entirety.

TABLE 1

Summary of Surface properties for the Mandrels of the Examples

| Sample ID | Example 1 | Example 2 |
|---|---|---|
| Mandrel Type | 4% glass in PTFE | 5% glass in PTFE |
| Outer Diameter, in | 0.0660 | 0.0900 |
| Inner Diameter, in | 0.0240 | 0.0320 |
| Ra, μ-in | 25.86 | 20.25 |
| Rq, μ-in | 33.92 | 36.55 |
| Ry, μ-in | 168.4 | 212.8 |

TABLE 2

Summary of Physical Properties for the Tubes of the Examples

| Sample ID | Comparative 2 | Example 1 | Example 2 |
|---|---|---|---|
| Mandrel Type | SPC | 4% glass in PTFE | 5% glass in PTFE |
| Inner Diameter, in | 0.0705 | 0.0676 | 0.0922 |
| Wall Thickness, in | 0.00057 | 0.00134 | 0.00192 |
| Ra, µ-in | — | 8.48 | 8.13 |
| Rq, µ-in | — | 9.78 | 10.18 |
| Ry, µ-in | — | 30.9 | 27.7 |
| Young's Modulus, psi | 65,100 | 260,000 | 115,000 |
| Stress at Break, psi | 7,700 | 12,300 | 11,000 |
| Strain at Break, % | 345 | 178 | 333 |
| Storage Modulus at 23° C., psi | 58,000 | 258,000 | 106,000 |
| Storage Modulus at 40° C., psi | 41,000 | 128,000 | 62,800 |
| Storage Modulus decrease per ° C., psi/° C. | 1200 | 7600 | 2540 |
| Burst Strength, psi | — | 84 | 69 |
| COF at 23° C. | — | 0.045 | 0.055 |

What is claimed is:

1. A tube having an inner surface, an outer surface, and an inner lumen, the tube comprising PTFE with a wall thickness less than 0.0040 inches, wherein the tube has a stress at break above 10,000 psi; and
    wherein the inner surface has a COF below 0.07 measured using a tribological test with sliding speeds against a stainless steel plate of 0.030 inches/s to 0.30 inches/s under an axial load of 0.225 lbf; and
    wherein the inner surface comprises patterning.

2. The tube of claim 1, wherein the inner surface has a minimum average surface roughness, Ra, of 8 µ-inch and/or a minimum LMS surface roughness, Rm, of 25 µ-inch.

3. The tube of claim 2, wherein the inner surface has both a minimum average surface roughness, Ra, of 8 µ-inch and a minimum LMS surface roughness, Rm, of 25 µ-inch.

4. The tube of claim 1, consisting essentially of PTFE.

5. A medical device comprising the tube of claim 1.

6. The medical device of claim 5, wherein the medical device is a catheter.

7. The tube of claim 1, wherein the patterning comprises indentations.

8. The tube of claim 1, wherein the COF is 0.055 or less.

9. The tube of claim 7, wherein the indentations are substantially spherical.

10. The tube of claim 7, wherein the indentations are substantially homogeneous throughout the inner surface.

11. The tube of claim 7, wherein the indentations are in the form of a random microstructure.

12. The tube of claim 1, wherein the inner surface has a minimum average surface roughness, Ra, of 8 µ-inch.

13. The tube of claim 1, wherein the inner surface has a minimum LMS surface roughness, Rm, of 25 µ-inch.

* * * * *